Patented Sept. 27, 1932

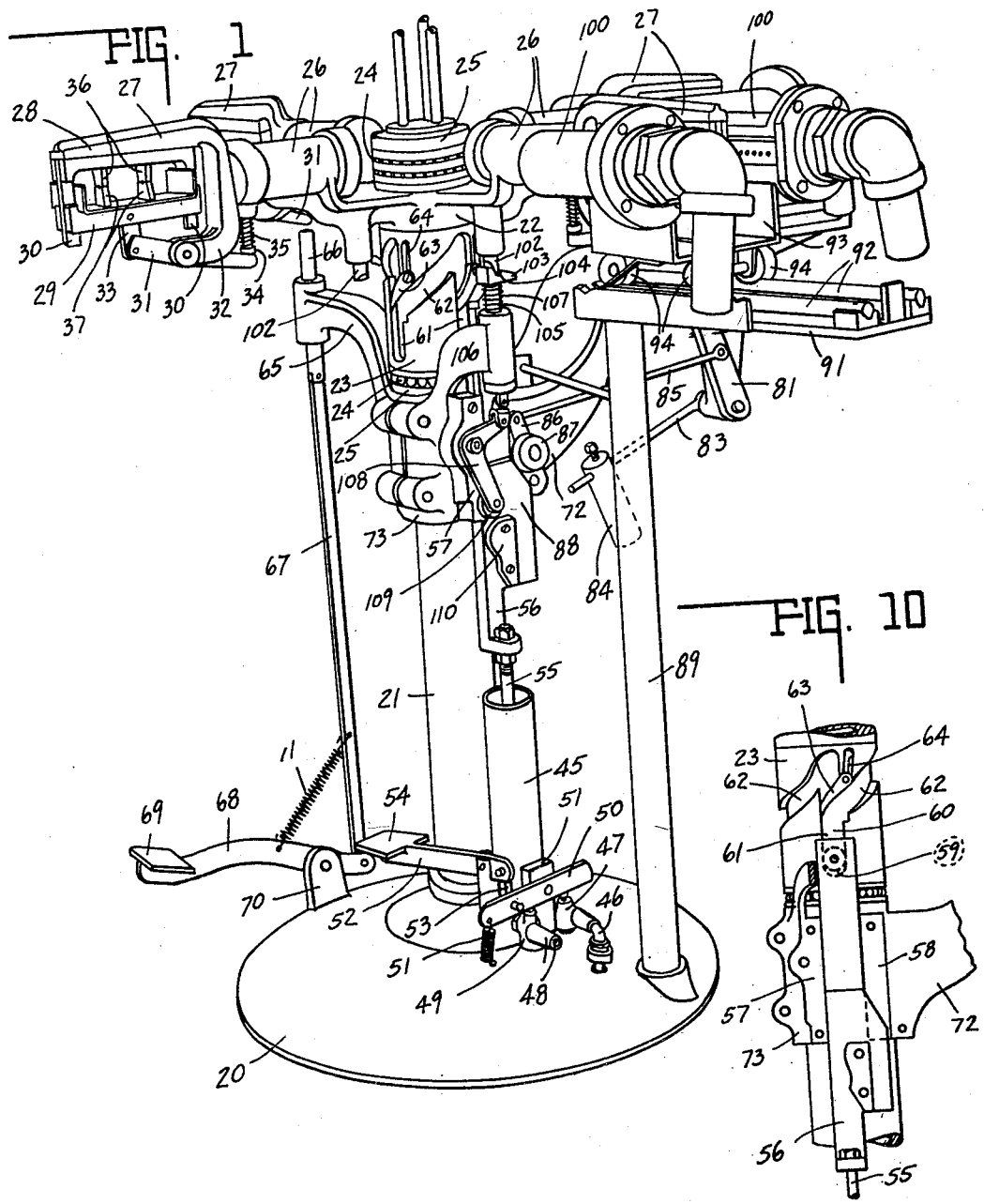

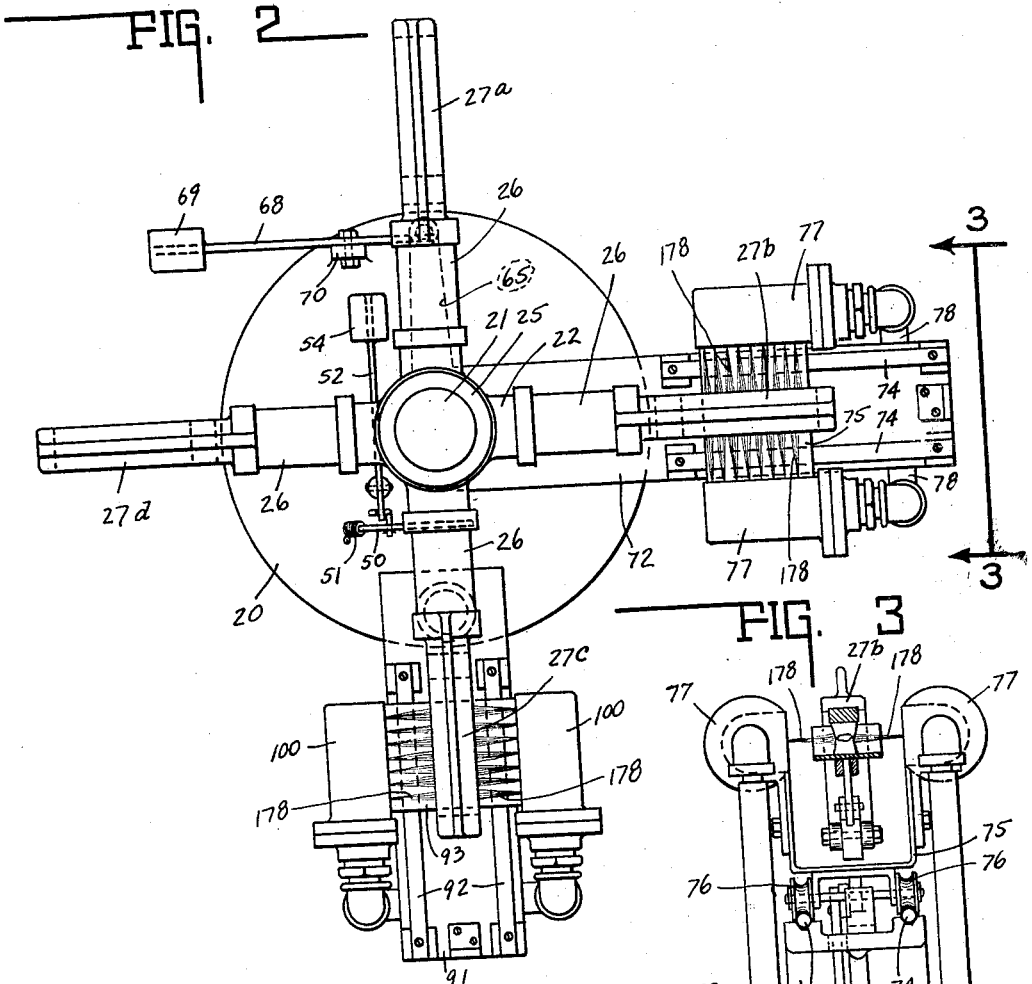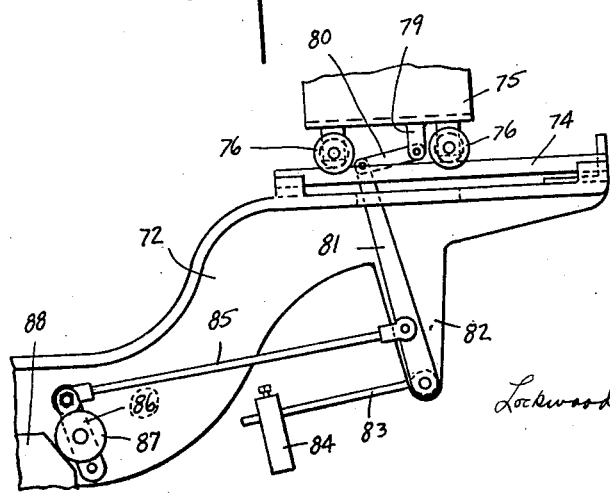

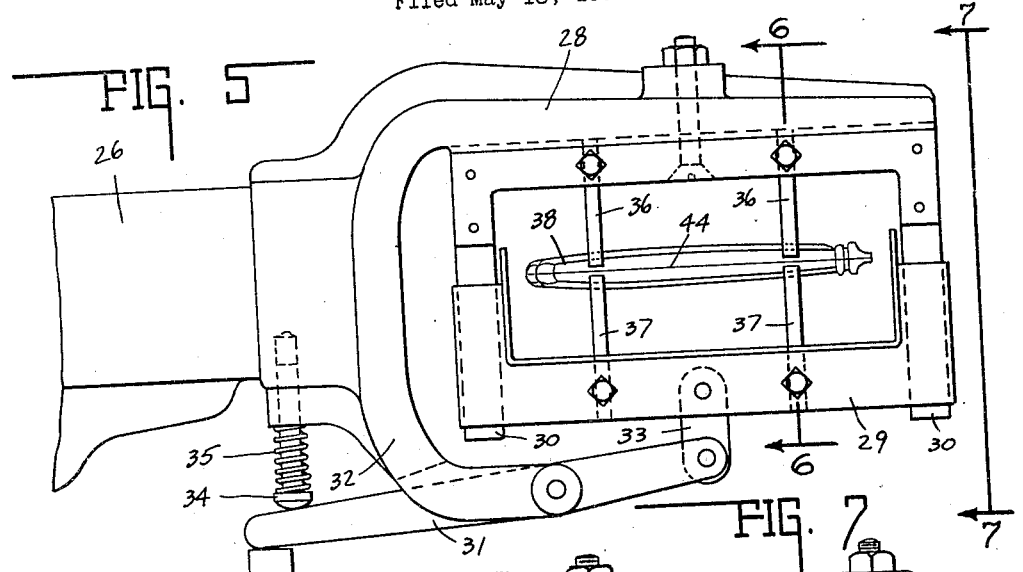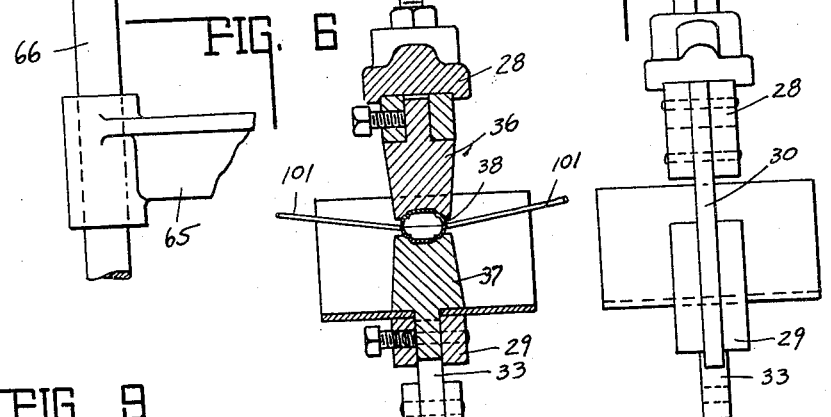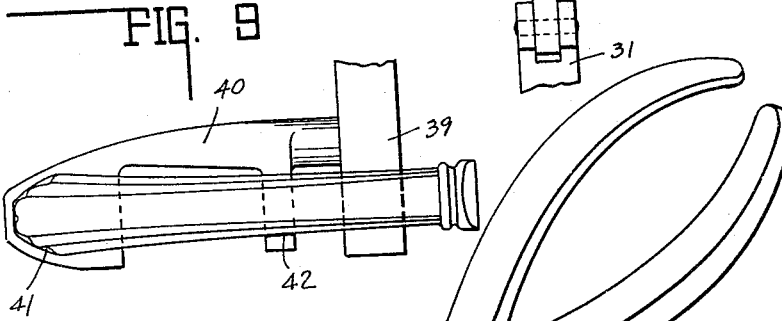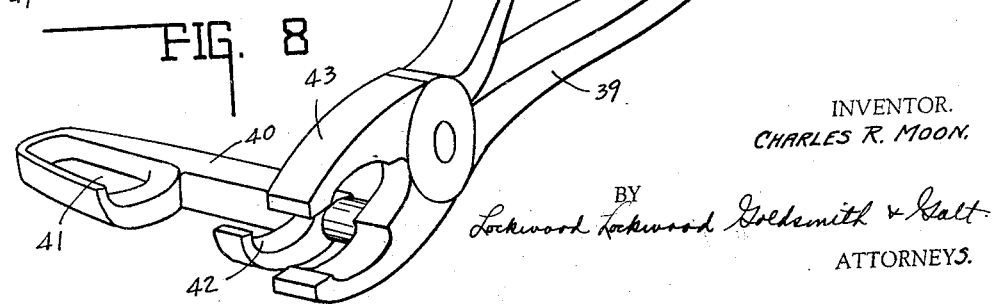

1,879,908

UNITED STATES PATENT OFFICE

CHARLES R. MOON, OF MUNCIE, INDIANA, ASSIGNOR TO ONTARIO MANUFACTURING COMPANY, OF MUNCIE, INDIANA, A CORPORATION

APPARATUS FOR MANUFACTURE OF HOLLOW SILVERWARE

Application filed May 18, 1931. Serial No. 538,065.

This invention relates to a method and apparatus for use in certain steps in the manufacture of hollow silverware, particularly in the manufacture of hollow handle table knives.

In the manufacture of such ware, the knife handles are usually formed in two halves pressed from sheets of the desired alloy. The two halves are then placed together in the proper relation for a finished handle and are soldered or brazed in that position with a so-called "solder" which normally melts at a lower temperature than the melting point of the alloy sheets. The principal object of the present invention is to provide apparatus by means of which the two halves of the handle may be rapidly and expeditiously united so that a large number of such handles may be manufactured in a given time with a minimum amount of manual labor.

The principal features of the apparatus by which the invention is carried out consist in the provision of a plurality of carriers mounted upon a rotating carrier head and each adapted to grasp the two halves of a knife handle and maintain the same in the proper relation for a finished handle. The carrier head and carriers are rotated step by step to bring the carriers successively to a number of operating positions, in each of which positions one of the necessary operations for the uniting of the parts of the handle is performed.

One feature of the method employed resides in the positioning of the two halves of the handle in the carriers with the joint therebetween in a substantially horizontal plane so that, when heated to a temperature at which the solder freely flows, it is only necessary to touch the end of a solder wire to the joint at a number of places about the same and the solder then flows freely along the joint and effectually unites the two halves.

Other objects and features of the invention will be understood from the accompanying drawings and the following description and claims:

Figure 1 is a perspective view of a complete machine for carrying out the invention. Figure 2 is a plan view of the top thereof. Figure 3 is an end view partly in section of a preferred form of heater for pre-heating the handles before they reach the soldering station. Figure 4 is a fragmentary detail of apparatus used to move the heater from the path of the carriers when the same are to be moved to a succeeding operating station. Figure 5 is an enlarged elevational view of one of the carriers. Figure 6 is a sectional view of the same taken on the line 6—6 of Figure 5. Figure 7 is an end view of the same taken on the line 7—7 of Figure 5. Figure 8 is a perspective view of a preferred form of a tool used for placing the handles in the carrier. Figure 9 is a fragmentary detail of the tool shown in Figure 8. Figure 10 is an elevational view illustrating a portion of the indexing mechanism used for moving the carrier-head.

In the drawings, a base 20 supports a vertical column 21 upon the upper end of which there is mounted a carrier head 22 having a cam collar 23 fastened thereto. The carrier head and cam collar are free to rotate upon the column 21 and are confined by means of ball bearings 24 and collars 25 carried upon said column. The carrier head 22 is formed with a plurality of radial arms 26, upon each of which there is mounted a carrier 27.

Each of the carriers 27 consists of an upper jaw 28 immovably fastened to the corresponding arm 26 and a lower jaw 29 slidably mounted with respect to the upper jaw 28 and guided by splines 30 carried by said jaw. A lever 31 is pivotally mounted upon an arm 32 which preferably forms a part of the same casting as the upper jaw 28. The outer end of the lever 31 is pivotally connected to a link 33 in turn pivotally connected to the lower jaw 29. The inner end of the said lever engages the head of a bolt 34 slidably mounted on the arm 26 and downwardly pressed by a spring 35. A pair of grip members 36 are removably mounted upon the upper jaw 28 and a similar pair 37 are similarly mounted on the lower jaw. The grip members 36 and 37 are properly shaped to fit the upper and lower surfaces respectively of a knife handle 38, as best shown in Figures 5 and 6. For each design of knife handle specially formed grip members are provided.

For placing the knife handles in the carrier, a tool 39, such as shown in Figure 8, is provided. The said tool is in the form of a common pair of pliers having an extension 40 upon one jaw thereof provided with recesses 41 and 42 within which the lower half of the knife handle may be laid. The upper half of the knife handle is then placed thereon in the proper position and is clamped by the upper jaw 43 of the plier tool. The inner end of the lever 31 is then raised against the action of spring 35 by mechanism to be hereinafter described, the lower jaw 29 is thereby pulled downwardly and the assembled knife handle is laid upon the lower grip members 37. The lever 31 is then released and the spring 35 moves the jaw 29 upwardly to grip the knife handle between the grip members 36 and 37. As is shown in Figure 5, when the knife handle is so gripped the joint 24 between the two halves is in a substantially horizontal plane.

For rotating the carrier head 22 to move the carriers into successive operating positions, a hydraulic cylinder 45 is provided. An inlet pipe 46 controlled by a valve 47 supplies oil or other operating fluid under pressure to the cylinder 45. An outlet pipe 48, controlled by an outlet valve 49, permits discharge of the fluid therefrom. A lever 50 is pivotally mounted upon a bracket 51 carried upon the base 20 and engages the operating stem of the valve 47 at one side of its pivot point and the operating stem of the valve 49 at the opposite side thereof. A tension spring 51 is connected at one end to the lever 50 and at the other end to the base 20 and pulls the lever 50 to engage the stem of valve 49 to permit discharge of fluid from the cylinder. A pivoted lever 52 is connected by a link 53 with the lever 50 and carries at its opposite end a pedal 54. By pressing downwardly on the pedal 54 the stem of valve 49 is released and the stem of valve 47 is depressed, thus permitting the entrance of the operating fluid to cylinder 45.

The cylinder 45 is provided with a piston, not shown, to which is connected a piston rod 55, the upper end of which is connected in turn to a slide 56. The said slide is guided by guide members 57 and 58 and may be maintained in position by a suitable tongue and groove connection with said guide members. The slide 56 carries at its upper end a roller 59 engaging a guideway 60 in the cam collar 23. The guideway 60 is formed with a plurality of vertical portions 61 corresponding in number to the number of operating positions at which it is desired to stop the carrier. The vertical portions 61 of the guideway are connected by inclined portions 62. At the entrance of each inclined portion 62 there is provided a switch dog 63 pivotally mounted upon the cam collar 23 and normally maintained in the position shown in Figures 1 and 10 by means of a spring 64 carried in a suitable recess in the cam collar.

By means of this mechanism, when the operating pedal 54 is depressed, the operating fluid entering the cylinder 45 forces the slide 56 and roller 59 upwardly within one of the vertical portions 61 of the guideway. When the said roller reaches the switch dog 63, it is guided into the inclined portion 62 of the guideway and thus rotates the cam collar, carrier head and carriers. Upon reaching its extreme upper position, the roller 59 has reached the upper end of the next succeeding vertical portion 61 of the guideway. If now the pedal 54 is released, the operating fluid escapes from the cylinder 45 and the slide 56 and roller 59 are free to drop by gravity. In this movement, the roller 59 passes downwardly in the vertical portion 61 of the guideway and, in passing the switch dog 63, it forces the same from its path against the action of the spring 64.

In the apparatus shown herein, four operating positions of the carriers are used, as best shown in Figure 2. In that figure, the carrier 27a is positioned at the loading and receiving station. At that station, there is provided a bracket 65, through the outer end of which a rod 66 is vertically slidable. The said rod is positioned beneath the end of the lever 31 of the carrier 27a and is raised and lowered by means of a link 67 pivotally connected thereto and pivotally connected at its lower end to a lever 68 carrying a pedal 69. The lever 68 is pivotally mounted upon a lug 70 carried by the base 20 and is maintained with the pedal 65 in the upraised position by means of a tension spring 71. By this means, when the pedal 69 is depressed, the rod 67 is elevated to engage the lever 31 and thereby move the lower jaw 29 of the carrier downwardly. When so moved, the finished knife handle may be removed and the two halves of the succeeding knife handle may be placed in the carrier as previously described.

In Figure 2, the carrier 27b is positioned at the so-called "pre-heating station". At this position, there is provided a bracket 72 forming a part of a casting 73 clamped about the column 21. The said bracket carries a pair of horizontal trackways 74. A burner carriage 75 fitted with rollers 76 rolls upon said trackway. The said carriage carries a pair of gas burners 77 which are supplied with fuel by a flexible connection 78 and which are normally positioned as shown in Figure 2. In that position, each burner throws a flame 78 upon the knife handle in the carrier and in this manner pre-heats the said handle to a desired preliminary temperature.

The carriage 75 carries on its undersurface a lug 79 to which is pivotally connected a link 80, the opposite end of which is connected to the upper end of a lever 81. The said lever extends downwardly through a suitable opening in the bracket 72 and is pivotally mounted at its lower end upon an arm 82 extending from said bracket. A counterweight arm 83 carrying a counterweight 84 is fastened to the lever 81 by means of its pivot pin and serves to maintain the carriage 75 in the operating position shown in Figure 2. A link 85 is connected to the lever 81 and is pivotally connected at its opposite end to a lever 86 pivotally mounted upon the bracket 72 and carrying a roller 87. The roller 87 is engaged by a cam 88 carried by the slide 56. In the upward movement of said slide, before the roller 59 engages the switch dog 63, the cam 88 engages the roller 87, thus forcing the link 85 and lever 81 to the right in Figure 4 and moving the carriage 75 and the burner 77 from the path of the carrier 27b before the movement of said carrier to the next succeeding operating position takes place. Upon completion of the movement of the carrier, the parts automatically return to operating position under the influence of the counterweight 84.

In Figure 2, the carrier 27c is positioned at a so-called "soldering position". At this position, there is provided a vertical column 89, upon the upper end of which there is carried a platform 90 in turn carrying trackways 92. A burner carriage 93, similar in form to carriage 75, travels upon rollers 94 upon the said trackway. The carriage 93 carries burners 100, each adapted to play a flame upon one side of the knife handle in the carrier 27c. The flame of the burner is so adjusted that the knife handle is heated to a temperature at which the silver solder flows freely. It is then only necessary to touch the end of a piece of silver solder wire 101 to the joint 44 at a number of places about said joint, as shown in Figure 6. The solder flows freely along the joint and effectually unites the halves of the handle. In the apparatus as shown herein, carriage 93 is moved by hand upon the trackway 92 when the soldering operation is complete. However, the carriage may be fitted with mechanism similar to that described for moving the burner carriage 75.

In Figure 2, the carrier 27b is positioned at the so-called "cooling station". At this point, the knife handles are cooled preparatory to their removal at the loading and receiving station. At this station, no further apparatus is necessary.

For accurately positioning the carriers at the various operating positions, there is provided on each of the arms 26 a downwardly-projecting indexing pin 102 adapted to engage an indexing groove 104 in a block 103 having an inclined face. The block 103 is carried upon the upper end of a stem 105 slidably mounted in a bracket 106 formed as a part of the casting 73. The block 103 is upwardly pressed by a compression spring 107 surrounding said stem. The lower end of the stem 105 is linked to one arm of a bell crank 108 pivotally mounted upon the guide member 57. The opposite arm of the bell crank carries a roller 109 engageable with a cam 110 carried by the slide 56. In the upward movement of the slide 56 before the commencement of the rotation of the carriers, the cam 110 engages the roller 109 and thus moves the block 103 downwardly to disengage the indexing groove 104 from the indexing pin 102. When the next succeeding indexing pin has been brought into position and slide 56 has returned to its lowermost position, the block 103 has returned to engage said succeeding indexing pin.

In the use of the apparatus, one man preferably performs the soldering operation while a helper places handles in the carriers and removes the same therefrom. When the soldering operation is complete, the operator withdraws the carriage 93 and burners 100. This serves as a signal to the helper to press the pedal 54 and operate the apparatus to move the next succeeding carrier into the soldering position. The handles reach the soldering position in a pre-heated condition so that the actual time of the soldering operation is reduced to a minimum. During the soldering operation, the helper has ample time to operate the pedal 69 and to remove and replace the handles.

The invention claimed is:

1. In apparatus of the class described, the combination of a support, a plurality of movable carriers carried thereby, each of said carriers being adapted to grasp the two halves of a split knife handle and maintain the same in the proper relation for a finished handle and said carriers being open at each side to permit access to said handle, indexing mechanism for moving said carriers step by step to bring the same successively to a number of operating stations, and a heater at one of said stations for heating said handles, said heater including a burner positioned at each side of a carrier when stopped at said operating station and adapted to play a flame upon each side of said handle, said heater also being movable out of the path of said carriers to permit movement thereof to the next succeeding station.

2. In apparatus of the class described, the combination of a support, a plurality of movable carriers carried thereby, each of said carriers being adapted to grasp the two halves of a split knife handle and maintain the same in the proper relation for a finished handle and said carriers being open at each side to permit access to said handle, indexing mechanism for moving said carriers step by step to bring the same successively to a number of operating stations, a heater at one of said stations for heating said handles, said heater including a burner positioned at each side of a carrier when stopped at said operating station and adapted to play a flame upon each side of said handle, said heater also being movable out of the path of said carriers to permit movement thereof to the next succeeding station, and mechanism automatically operable by the operation of said indexing mechanism to so move said heater.

3. In apparatus of the class described, the combination of a support, a carrier head rotatably carried thereby, a plurality of carriers mounted on said head, each of said carriers being adapted to grasp the two halves of a split knife handle and maintain the same in the proper relation for a finished handle, said carriers being open at each side to permit access to said handle, indexing mechanism for moving said carriers step by step to bring the same successively to a number of operating stations, and a heater at one of said stations for heating said handles, said heater including a burner positioned at each side of a carrier when stopped at said operating station and adapted to play a flame upon each side of said handle.

4. In apparatus of the class described, the combination of a support, a carrier head rotatably carried thereby, a plurality of carriers mounted on said head, each of said carriers being adapted to grasp the two halves of a split knife handle and maintain the same in the proper relation for a finished handle, said carriers being open at each side to permit access to said handle, indexing mechanism for moving said carriers step by step to bring the same successively to a number of operating stations, and a heater at one of said stations for heating said handles, said heater including a burner positioned at each side of a carrier when stopped at said operating station and adapted to play a flame upon each side of said handle, said heater also being movable out of the path of said carriers to permit movement thereof to the next succeeding station.

5. In apparatus of the class described, the combination of a support, a carrier head rotatably carried thereby, a plurality of carriers mounted on said head, each of said carriers being adapted to grasp the two halves of a split knife handle and maintain the same in the proper relation for a finished handle, said carriers being open at each side to permit access to said handle, indexing mechanism for moving said carriers step by step to bring the same successively to a number of operating stations, a heater at one of said stations for heating said handles, said heater including a burner positioned at each side of a carrier when stopped at said operating station and adapted to play a flame upon each side of said handle, said heater also being movable out of the path of said carriers to permit movement thereof to the next succeeding station, and mechanism automatically operable by the operation of said indexing mechanism to so move said burner.

6. In apparatus of the class described, the combination of a central vertical column, a carrier head rotatably carried thereby, a cam collar fastened to said carrier head and having a guideway formed therein, said guideway having a plurality of portions arranged longitudinally of said collar and inclined connecting portions connecting said longitudinal portions, a member engaging said guideway and reciprocable in a direction substantially parallel to the axis of rotation of said carrier head and collar, switch dogs normally positioned to guide said member into the inclined portions of said guideway to rotate said carrier head and collar in the movement of said member in one direction, said dogs being movable to permit passage of said member through the longitudinal portions of said guideway in its movement in the opposite direction, and means for reciprocating said member.

In witness whereof, I have hereunto affixed my signature.

CHARLES R. MOON.